(12) United States Patent
Vaughn et al.

(10) Patent No.: US 11,317,561 B2
(45) Date of Patent: May 3, 2022

(54) LAWNMOWER PROPULSION SYSTEM FOR USE WITH DC POWER SOURCE

(71) Applicant: Honda Motor Co., Ltd., Tokyo (JP)

(72) Inventors: Christopher W. Vaughn, Mebane, NC (US); Hiroshi Hojo, Chapel Hill, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 350 days.

(21) Appl. No.: 16/659,822

(22) Filed: Oct. 22, 2019

(65) Prior Publication Data
US 2021/0112712 A1  Apr. 22, 2021

(51) Int. Cl.
*A01D 34/82* (2006.01)
*A01D 34/76* (2006.01)
*A01D 34/68* (2006.01)

(52) U.S. Cl.
CPC ............. *A01D 34/82* (2013.01); *A01D 34/68* (2013.01); *A01D 34/76* (2013.01)

(58) Field of Classification Search
CPC ......... A01D 34/82; A01D 34/68; A01D 34/76
See application file for complete search history.

(56) References Cited

U.S. PATENT DOCUMENTS

| | | | | |
|---|---|---|---|---|
| 2,491,544 | A * | 12/1949 | Arkenberg | A01D 34/63 56/12.9 |
| 3,696,595 | A * | 10/1972 | Dahl | A01D 43/077 56/16.9 |
| 4,121,405 | A * | 10/1978 | Wolf | A01D 34/73 56/12.9 |
| 4,194,345 | A * | 3/1980 | Pioch | A01D 34/81 56/17.5 |
| 5,012,633 | A * | 5/1991 | Ito | A01D 43/077 56/12.9 |
| 5,622,051 | A * | 4/1997 | Iida | B60K 17/10 60/456 |
| 6,062,013 | A * | 5/2000 | Wolske | A01D 34/005 56/255 |
| 6,401,869 | B1 * | 6/2002 | Iida | B60K 17/105 184/6.25 |
| 6,848,523 | B2 | 2/2005 | Ishikawa et al. | |
| 8,429,885 | B2 | 4/2013 | Rosa et al. | |
| 2013/0046448 | A1 | 2/2013 | Fan et al. | |
| 2016/0338266 | A1 | 11/2016 | Yamaoka et al. | |
| 2020/0315090 | A1 * | 10/2020 | Hasegawa | A01D 34/001 |
| 2020/0367431 | A1 * | 11/2020 | Ito | A01D 34/82 |
| 2020/0383267 | A1 * | 12/2020 | Nishimura | A01D 34/68 |
| 2021/0169007 | A1 * | 6/2021 | Xiao | A01D 34/78 |

* cited by examiner

*Primary Examiner* — Abigail A Risic
(74) *Attorney, Agent, or Firm* — Armstrong Teasdale LLP

(57) ABSTRACT

A lawnmower is provided. The lawnmower includes a prime mover, a first pulley assembly, a second pulley assembly, a cooling fan, and a blade assembly. The prime mover includes a drive shaft. The first pulley assembly is coupled to the drive shaft. The second pulley assembly is coupled to the first pulley assembly. The blade assembly is coupled to the prime mover via the second pulley assembly. The cooling fan is coupled to the second pulley assembly.

20 Claims, 2 Drawing Sheets

LAWNMOWER PROPULSION SYSTEM FOR USE WITH DC POWER SOURCE

BACKGROUND

This invention relates generally to lawnmowers, and more particularly, to lawnmower architecture for use with a DC power source.

Known lawnmowers can be configured as garden tractors, riding mowers, commercial walk-behind mowers and smaller walk-behind mowers. At least one cutting blade is typically mounted in a cutting chamber defined in a deck for all of these lawnmower configurations. At least some known lawnmowers use a gas-powered engine or an electric motor mounted to the mower housing as a prime mover. Typically, such prime movers are positioned directly above a center axis of rotation of the cutting blades. In addition to powering the blade assembly, at least some known lawnmowers are self-propelled and include a propulsion assembly that is typically coupled to front wheels, back wheels, or both front and back wheels coupled to the housing.

In known mowers that are not gas-powered, typically not much space is allocated on the mower housing for energy storage. To increase the amount of energy storage, at least some known DC motor-driven mowers use large capacity batteries. Generally an amount of heat generated by the batteries when the mower is under a heavy load, such as when cutting longer grass, also increases. Larger batteries increase energy storage capacity and thus increase mowing time between charges. Moreover, they also increase the freedom of movement within a yard as compared to AC motor-driven mowers that are attached to an electrical extension cord. However, over time, operating a lawnmower with batteries that are operating at higher temperatures can shorten the useful life of the batteries.

BRIEF DESCRIPTION

In one aspect, a lawnmower is provided. The lawnmower includes a prime mover, a first pulley assembly, a second pulley assembly, and a cooling fan. The prime mover includes a drive shaft. The first pulley assembly is coupled to the drive shaft. The second pulley assembly is coupled to the first pulley assembly. The cooling fan is coupled to the first pulley assembly and is configured to discharge cooling air over at least a portion of said lawnmower, said prime mover for powering said lawnmower.

In another aspect, a lawnmower is provided. The lawn mower includes a housing, a plurality of wheels, a cooling fan, and a propulsion system. The deck includes a forward side, and an opposite rear side coupled to the forward side by a pair of opposed sides. The wheels are rotatably coupled to the deck. At least one of the wheels is a forward wheel coupled adjacent to the deck forward side. At least a second of the wheels is a rear wheel coupled adjacent to the deck rear side. The energy storage is coupled to the deck between the deck forward and rear sides. The propulsion system includes a prime mover coupled to the deck behind the rear of the mower deck. The prime mover includes a drive shaft. The propulsion system also includes a first pulley assembly coupled to the drive shaft, a second pulley assembly coupled to the first pulley assembly, and a blade assembly rotatably coupled beneath the housing and coupled to the second pulley assembly.

In a further aspect, a self-propelled lawnmower is provided. The lawnmower includes a deck including at least a forward side and an opposite rear side, a handle coupled to the housing and extending aftward from the housing rear side, an energy storage coupled to an upper surface of the housing, and a propulsion system. The propulsion system includes a prime mover coupled to the housing upper surface such that the prime mover is between the handle and the energy storage. The propulsion system also includes a first pulley assembly coupled to a drive shaft extending from the prime mover, a second pulley assembly coupled to the first pulley assembly, and a blade assembly rotatably coupled to the housing and to the second pulley assembly.

In a further aspect, a self-propelled lawnmower is provided. The lawnmower includes a deck, a handle, an energy storage, a blade assembly, and a propulsion system. The deck includes at least a forward side and an opposite rear side. The handle is coupled to the deck and extends aftward from the deck rear side. The energy storage is coupled to an upper surface of the deck. The blade assembly is rotatably coupled to the deck. The propulsion system includes a prime mover coupled to the deck, a first pulley assembly, and a second pulley assembly. The prime mover is between the handle and the energy storage and includes a drive shaft. The first pulley assembly is coupled to the drive shaft. The second pulley assembly is coupled to the first pulley assembly and to the blade assembly. The cooling fan is coupled to at least one of the blade assembly and the propulsion system for supplying cooling air towards the lawnmower.

DETAILED DESCRIPTION

Embodiments of the present disclosure relate to self-propelled lawnmowers that include a battery-powered prime mover that is located over a propulsion transmission of the lawnmower. In some embodiments, the propulsion transmission is coupled to front wheels of the lawnmower. In some embodiments, the propulsion transmission is coupled to rear wheels of the lawnmower. In each implementation, the prime mover is coupled to a rotary cutter blade shaft and to the propulsion system. Moreover, in each embodiment, by moving the prime mover to a location over the propulsion transmission, space typically reserved on the lawnmower housing is freed up for use by energy storage. The embodiments described herein are exemplary and are not limited to the descriptions provided.

Figure 1:
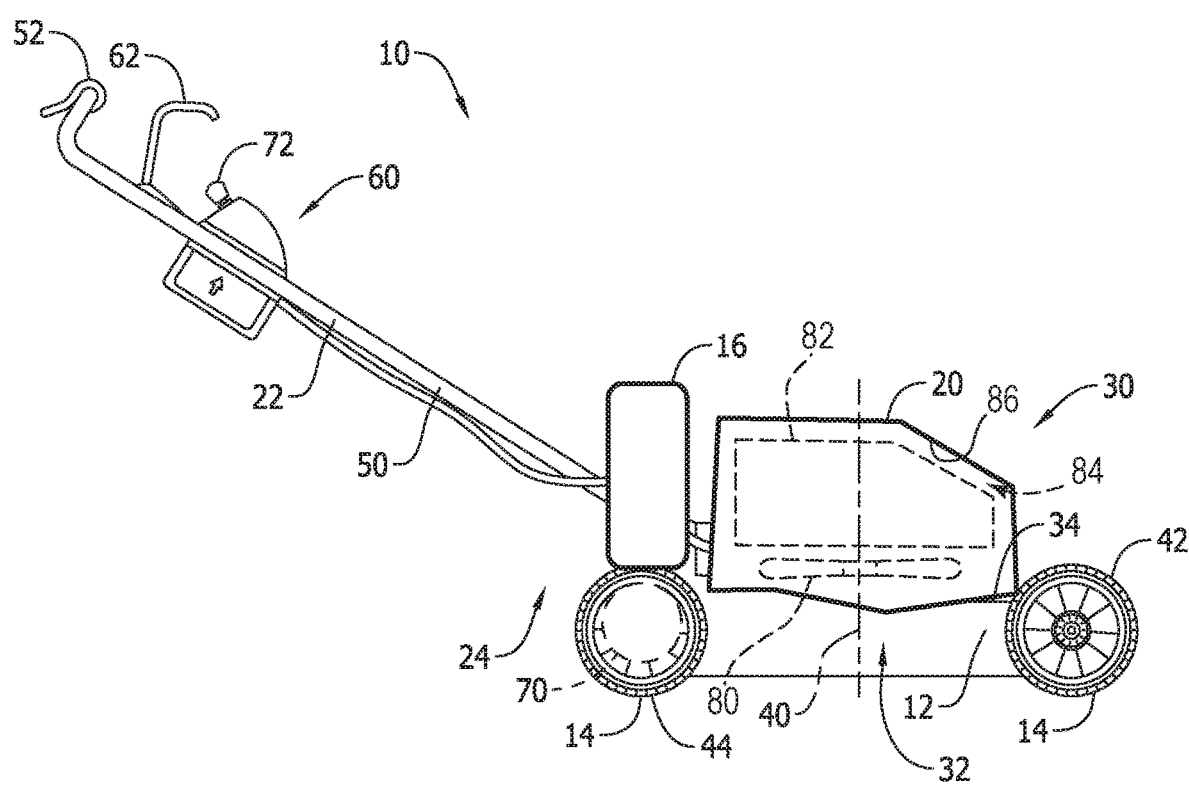
FIG. 1 is a partial schematic side view of an exemplary lawnmower.

FIG. 1 is a partial schematic side view of an exemplary self-propelled lawnmower 10. More specifically, in the exemplary embodiment, lawnmower 10 includes a deck 12 that includes a cutter housing (not shown), wheels 14, a prime mover 16 (shown in block form) mounted to deck 12, and an energy storage 20 (shown in block form). At least one cutting blade (not shown in FIG. 1) is coupled to lawnmower 10 below deck 12, and a steering handle 22 is coupled to deck 12 such that handle 22 extends generally upwardly from deck 12. Lawnmower 10 may include an optional collection bag (not shown) that is coupled a rear side 24 of mower deck 12.

In the exemplary embodiment, deck 12 is generally rectangular and has a forward side 30, an opposite rear side 24, and a pair of opposing sides 32 that extend between forward and rear sides 30 and 24, respectively. In other embodiments, deck 12 may have any other shape that enables lawnmower 10 to function as described herein. Deck 12 also includes an upper surface 34 and an opposite inner surface (not shown). The deck inner surface defines a portion of the cutter housing and defines a cavity (not shown) that the cutting blades are rotatably coupled within.

In the exemplary embodiment, the cutting blades are rotatably coupled to lawnmower 10 and rotate about an axis of rotation 40 that is substantially vertical such that the blades rotate in generally horizontal cutting planes within the cutter housing cavity. The blades may be configured as either a single cutting element or as multiple cutting elements that each cut vegetation at the level of the cutting plane.

A plurality of wheels 14 are rotatably coupled to deck 12. More specifically, in the exemplary embodiment, a pair of front wheels 42 are coupled along each deck side 32 adjacent deck forward side 30, and a pair of rear wheels 44 are coupled along each deck side 32 adjacent deck rear side 24. In the exemplary embodiment, a position of wheels 14 relative to deck 12 is selectively adjustable to enable a user adjust a cutting height of lawnmower 10. In alternative embodiment, lawnmower 10 can include any other number of wheels 14 that enables lawnmower 10 to function as described herein, such as only a single wheel 14 coupled to deck forward side 30. It should be noted that although wheels 14 are illustrated as being approximately the same size, in some embodiments, rear wheels 44 may be larger than front wheels 42 or vice versa.

Handle 22 is generally U-shaped and extends generally upwardly and rearwardly from deck rear side 24. Handle 22 enables a user who walks behind lawnmower 10 to guide and manipulate lawnmower 10 during operation of lawnmower 10. In the exemplary embodiment, handle 22 includes a pair of upwardly-extending support members 50 and a generally horizontally-oriented support member 52 that extends laterally between members 50 and that forms a hand grip for the user.

In the exemplary embodiment, handle 22 supports several controls 60 for the mower. For example, in the exemplary embodiment, lawnmower 10 is self-propelled and includes an actuating clutch (not shown) that engages a propulsion system 70 included with lawnmower 10. A drive clutch lever 62 is coupled to handle 22 to enable the user to selectively engage and disengage a transmission within the propulsion system 70. In addition, in the exemplary embodiment, a throttle lever 72 is coupled to handle 22. Throttle lever 72 enables a user to control and vary the prime mover speed. In alternative embodiments, controls 60 may be buttons, switches, or the like, and are not limited to being levers. In addition, in the exemplary embodiment, lawnmower 10 also includes a cutter system clutching system (not shown) that enables a user to selectively start and stop blade rotation. In one embodiment, the cutter system clutching system is similar to a known blade brake clutch (BBC) or a belt clutching pulley.

Propulsion system 70 is coupled to at least one wheel 14 to provide propulsion or motive power to lawnmower 10 and to thus enable lawnmower 10 to be self-propelled. In the exemplary embodiment, propulsion system 70 includes a prime mover 16 that supplies power to lawnmower 10, and in the exemplary embodiment, propulsion system 70 also includes a rear transmission (not shown in FIG. 1) that extends between rear wheels 44, such that only rear wheels 44 receive drive power from prime mover 16. In the exemplary embodiment, lawnmower 10 is a rear-wheel drive mower. In another embodiment, propulsion system 70 may include only a front transmission of lawnmower 10 and only front wheels 42 receive drive power from prime mover 16. In a further alternative embodiment, propulsion system may include both a front and rear transmission to enable at least one front wheel and at least one rear wheel 42 and 44, respectively, to receive drive power from prime mover 16.

Figure 2:
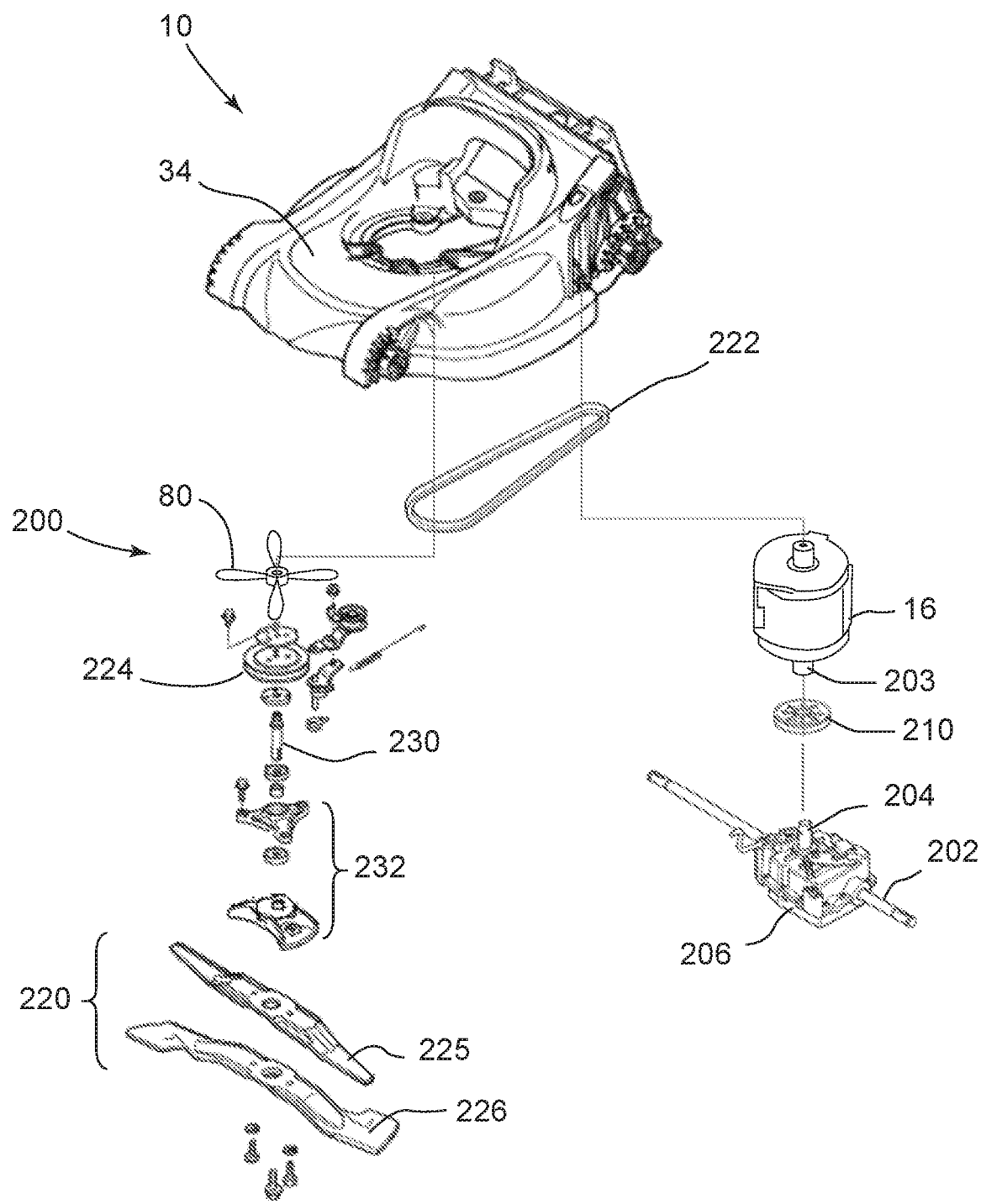
FIG. 2 is an exploded schematic view of an exemplary propulsion system that may be used in the lawnmower shown in FIG. 1.

In the exemplary embodiment, prime mover 16 is a battery-powered, DC motor and is coupled to mower deck upper surface 34 such that prime mover 16 is not concentrically aligned with respect to deck 12 and/or the cutter blade(s) 220 (shown in FIG. 2). In an alternative embodiment, prime mover 16 may be coupled to a mower transmission directly or independently, rather than being coupled to mower deck upper surface 34. As such, blade axis of rotation 40 does not extend through prime mover 16. More specifically, in the exemplary embodiment, prime mover 16 is positioned directly over the rear transmission, such that prime mover 16 is between rear wheels 44. In an alternative embodiment, propulsion system 70 is positioned directly over the mower forward transmission. In each embodiment, prime mover 16 is coupled to an actuating clutch (not shown) inside the transmission that permits the user to selectively vary the drive speed of lawnmower 10.

Prime mover 16 is also coupled to cutter blade(s) 220 to supply power to the blades. More specifically, in one embodiment, prime mover 16 is coupled to the blades with a power take-off (PTO) shaft. In another embodiment, prime mover 16 is coupled to the blades with a belt system (not shown).

In the exemplary embodiment, energy storage 20 is also coupled to mower deck upper surface 34 such that energy storage occupies a footprint that extends directly over the cutting blades. As such, the blade axis of rotation 40 extends at least partially through energy storage 20. Because energy storage 20 is coupled and occupies the footprint of deck upper surface 34 that is typically occupied by prime movers on at least some known mowers, energy storage 20 has a larger area and can thus accommodate larger capacity batteries as compared to known battery-driven mowers. Moreover, the larger footprint facilitates providing the user with more energy storage and thus facilitates increasing the freedom of movement within a yard as compared to AC motor-driven mowers that are tethered to an electric extension cord and facilitates increasing mowing times between charges.

In addition, because prime mover 16 is positioned a distance from the blade axis of rotation, the blades 220 (shown in FIG. 2), and more specifically, a blade shaft 230 (shown in FIG. 2) rotatably coupling the blades to deck 12, may be coupled to a cooling fan 80 to facilitate increasing cooling to the footprint occupied by energy storage 20. In the exemplary embodiment, cooling fan 80 is rotatably above the mower blades to circulate airflow within deck 12 and/or to facilitate cooling energy storage 20. More specifically, in the exemplary embodiment, energy storage 20 houses at least one battery 82 therein. Each battery 82 is positioned, in the exemplary embodiment, such that a gap 84 is defined at least partially around each battery 82 and between battery 82 and an inner surface 86 of energy storage 20. Gap 84 is sized to enable cooling air discharged from fan 80 to circulate around an exterior of battery 82 to facilitate cooling of battery 82. In one embodiment, energy storage 20 may be formed with vents (not shown) along its upper surface 86 that enable spent cooling air to be discharged from gap 84 and to facilitate a constant flow of fresh cooling air into gap 84.

As a result, enhanced cooling of batteries 82 within energy storage 20 is facilitated especially when lawnmower 10 is under a heavy load, such as when cutting damp or thick vegetation. In one embodiment, energy storage 20 uses at least one rechargeable lithium ion battery pack 82. Alternatively, energy storage 20 may use other battery types, including, but not limited to lithium-air batteries, lithium-sulfur batteries, li metal anodes, sodium ion batteries, magnesium ion batteries, and/or any other battery or combination of rechargeable batteries that enables lawnmower 10 to function as described herein. In another embodiment, energy storage 20 is rechargeable through a solar energy conversion module that is configured to convert sunlight to electricity.

During mower operations, because prime mover 16 is coupled directly over the propulsion transmission 206 (shown in FIG. 2) and is connected to cutter blade(s) 220 via a belt system and/or a PTO shaft, the footprint available for energy storage 20 is larger than is typically used with at least some known lawnmowers. In one embodiment, cooling fan 80 circulates cooling air only when cutter blade(s) 220 are engaged. In another embodiment, cooling fan 80 is full-time operational when lawnmower 10 is energized. The larger footprint of energy storage 20 enables the use of larger capacity batteries 82, and enhanced cooling enables the batteries to operate more efficiently and facilitates extending a useful life of batteries 82. As a result, the larger energy storage capacity enables the user to use lawnmower 10 for longer periods of operation without requiring charging or changing of batteries 82.

In addition, because lawnmower 10 is a battery-powered, DC motor driven mower, there is no exhaust needed from lawnmower 10 and lawnmower 10 uses comparatively less energy than at least some known mowers. Moreover, lawnmower 10 is operable without frequent tune-ups or oil changes, and without hot surfaces being created by a combustion engine. The increased capacity enables energy storage 20 to deliver consistent power output. In addition, because prime mover 16 is coupled directly above the propulsion transmission 206, additional power may be delivered to the transmission to enable a high speed drive system.

FIG. 2 is an exploded schematic view of an exemplary propulsion system 200 that may be used with lawnmower 10. It should be noted that in FIG. 2, energy storage 20 (shown in FIG. 1) has been removed for clarity. In the exemplary embodiment, prime mover 16 is a battery-powered, DC motor that is coupled to mower upper deck surface 34. More specifically, in the exemplary embodiment, prime mover 16 is positioned directly above an input shaft 204 of transmission 206 such that prime mover 16 is between rear wheels 44 (shown in FIG. 1). Rear axle 202 extends between rear wheels 44. More specifically, prime mover 16 includes an input shaft 204 that is coupled to a transmission 206 coupled to rear axle 202. A drive pulley 210 is rotatably coupled to input shaft 204 such that drive pulley 210 is between prime mover 16 and transmission 206. The relative orientation of prime mover 16 and transmission 206 enables prime mover 16 to be directly coupled to an internal or actuating clutch (not shown) within transmission 206 via shaft 204. The actuating clutch enables the user to selectively vary the drive speed of lawnmower 10.

In the exemplary embodiment, prime mover 16 is also coupled to cutter blade(s) 220 to supply power to cutter blade(s) 220. More specifically, in one embodiment, prime mover 16 is coupled to cutter blade(s) 220 with a power take-off (PTO) shaft. In the exemplary embodiment, prime mover 16 is coupled to cutter blade(s) 220 with a belt 222. More specifically, in the exemplary embodiment, lawnmower 10 includes a second pulley 224 that is coupled to drive pulley 210 via belt 222. Drive pulley 224 is coupled to cutter blade(s) 220 via a blade drive shaft 230. In the exemplary embodiment, cooling fan 80 is also coupled to shaft 230 to provide cooling air to facilitate cooling energy storage 20.

Cutter blade(s) 220 are secured to shaft 230 via a blade holder assembly 232 that includes a clutch brake assembly (not shown) that enables selective engagement of cutter blade(s) 220. In the exemplary embodiment, cutter blade(s) 220 include an upper cutter blade 225 and a lower cutter blade 226. Alternatively, lawnmower 10 may include more or less than two cutter blades 220. Moreover, in the exemplary embodiment, energy storage 20 is mounted directly above cutter blade(s)d 220.

In one embodiment, the propulsion system 200 may implement a motor drive with reduction (mechanical advantage). A motor drive with reduction enables the use of a relatively smaller sized motor because the torque requirement is smaller. As such, motor reduction may facilitate cost reduction. Moreover, combining the an adaptive motor reduction structure implemented on lawnmower 10 via a belt 222 and pulley system extending between a prime mover 16 and cutting blade(s) 220 provides an additional benefit of reducing the overall height of lawnmower 10 above mower deck surface 34. As a result, a center of gravity of lawnmower 10 is lower and closer to the ground, thus facilitating enhanced and more stable handling of lawnmower 10, and an increased flexibility for mowing grass as lawnmower 10 can more easily be maneuvered under tree branches, benches, or the like. Moreover, because the prime mover 16 is smaller, it uses a shorter mower shaft 230 as compared to known mowers, which facilitates reducing the likelihood of motor shaft bending from blade impact.

The above-described architecture provides a DC-powered lawnmower that is cost-effective to manufacture and assemble and that facilitates reducing the number of battery charges needed to cut vegetation. As a result, in the exemplary embodiment, a mulching assembly is provided that facilitates increasing the flexibility to the mower operator while reducing costs in a reliable manner.

Exemplary embodiments of lawnmower architecture are described above in detail. Although the mower architecture are herein described and illustrated in association with a walk-behind lawnmower, the invention is also intended for use on commercial walk-behind mowers, riding mowers and lawn tractors. Moreover, it should also be noted that the components of the mower architecture are not limited to the specific embodiments described herein, but rather, aspects of each component may be utilized independently and separately from other components and methods of assembly described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A lawnmower comprising:
a prime mover comprising a drive shaft;

a first pulley assembly coupled to said drive shaft;
a deck;
an energy storage device coupled to an upper surface of said deck;
a second pulley assembly coupled to said first pulley assembly; and
a cooling fan coupled to said first pulley assembly and configured to discharge cooling air over at least a portion of said lawnmower, said prime mover for powering said lawnmower.

2. A lawnmower in accordance with claim 1 wherein said first pulley assembly is coupled to said second pulley assembly via a belt.

3. A lawnmower in accordance with claim 1 further comprising a blade assembly coupled to said prime mover via said second pulley assembly.

4. A lawnmower in accordance with claim 1 further comprising a blade assembly, said blade assembly is rotatably coupled beneath said deck and has a center axis of rotation, said energy storage device is coupled said deck such that the center axis of rotation extends through said energy storage device, said energy storage is for use in supplying energy to said prime mover.

5. A lawnmower in accordance with claim 4 wherein said prime mover is coupled to said deck such that said prime mover is not within an area defined by a footprint of said energy storage.

6. A lawnmower in accordance with claim 5 wherein said prime mover is coupled to the deck such that said prime mover is generally above a rear axle of said lawnmower.

7. A lawnmower in accordance with claim 5 wherein said prime mover is coupled directly over a transmission coupled to at least one of a forward axle and a rear axle of said lawnmower.

8. A lawnmower comprising:
a deck comprising at least a forward side, and an opposite rear side coupled to said forward side by a pair of opposed sides;
an electrical storage device coupled to said deck;
a plurality of wheels rotatably coupled to said deck, wherein at least one of said wheels is a forward wheel coupled adjacent to said deck forward side, and at least a second of said wheels is a rear wheel coupled adjacent to said deck rear side;
a cooling fan;
a propulsion system comprising:
a prime mover coupled to said deck and comprising a drive shaft;
a first pulley assembly coupled to said drive shaft; and
a second pulley assembly coupled to said first pulley assembly with a belt, said prime mover coupled to said cooling fan to facilitate cooling at least a portion of said lawnmower.

9. A lawnmower in accordance with claim 8 further comprising a blade assembly rotatably coupled beneath said deck, said blade assembly coupled to said second pulley assembly.

10. A lawnmower in accordance with claim 9 wherein said blade assembly has an axis of rotation, said prime mover is coupled to said housing such that said axis of rotation does not extend through said prime mover.

11. A lawnmower in accordance with claim 8 wherein said first pulley assembly is coupled to said second pulley assembly via a belt.

12. A lawnmower in accordance with claim 8 wherein said lawnmower is self-propelled by said propulsion system.

13. A lawnmower in accordance with claim 8 wherein said prime mover is a DC motor coupled to said deck generally above a rear axle of said lawnmower.

14. A lawnmower in accordance with claim 8 wherein said prime mover is coupled to said housing directly above a transmission coupled to one of a rear axle and a forward axle.

15. A self-propelled lawnmower comprising:
a deck comprising at least a forward side and an opposite rear side;
a handle coupled to said deck and extending aftward from said deck rear side;
a cooling fan;
a blade assembly rotatably coupled to said deck;
an energy storage device coupled to said deck; and
a propulsion system comprising:
a prime mover coupled to said deck, said prime mover positioned between said handle and said energy storage, said prime mover comprising a drive shaft;
a first pulley assembly coupled to said drive shaft; and
a second pulley assembly coupled to said first pulley assembly, said second pulley assembly coupled to said blade assembly, said cooling fan coupled to at least one of said blade assembly and said propulsion system for supplying cooling air towards said lawnmower.

16. A self-propelled lawnmower in accordance with claim 15 wherein said first pulley assembly is coupled to said second pulley assembly via a belt.

17. A self-propelled lawnmower in accordance with claim 15 wherein said blade assembly has an axis of rotation extending therethrough, said prime mover is coupled a distance from the axis of rotation.

18. A self-propelled lawnmower in accordance with claim 15 wherein said blade assembly has an axis of rotation extending therethrough, said axis of rotation does not extend through a footprint of said prime mover.

19. A self-propelled lawnmower in accordance with claim 15 wherein said energy storage device is a DC battery, said energy storage device positioned above said cooling fan for receiving cooling air discharged therefrom.

20. A self-propelled lawnmower in accordance with claim 19 wherein said energy storage comprises at least one battery housed therein such that a gap is defined between an inner surface of said energy storage and said at least one battery, said cooling fan positioned to discharge cooling air into said gap.

* * * * *